United States Patent Office 3,275,404
Patented Sept. 27, 1966

3,275,404
PROCESS FOR SEPARATING RARE EARTH METAL VALUES
Ferdinand H. Firsching, Alton, Ill., assignor to Research Corporation, New York, N.Y., a corporation of New York
No Drawing. Filed Oct. 7, 1963, Ser. No. 314,506
5 Claims. (Cl. 23—22)

This application is a continuation-in-part of application Serial No. 223,547 filed Sept. 13, 1962, and now abandoned.

This invention relates to a method of separating rare earth metal by means of chelating or sequestering agents.

The method comprises adding to a solution containing a plurality of rare earth metal salts at least two chelating agents, an anion forming a relatively insoluble salt with the rare earth metal having the lesser chelate stability and altering the composition of the resulting solution in a direction to decrease the solubility of such relatively insoluble salt.

I have found that when any two or more chelating agents are added to a solution of two or more rare earth metal salts there is a differential complex formation whereby the more stable rare earth metal chelating agent complexes are preponderantly formed, that a cationic replacing agent tends to release preponderantly the rare earth metal component of the complex of lesser stability and permit the preferential precipitation of salts of such rare earth metal component in the presence of suitable anions forming salts of relatively low solubility therewith.

The preferential precipitation of a salt of the rare earth metal forming the complex of lesser stability with the sequestering agents can also be effected by altering the composition of the solution in other ways to bring about a decrease in the solubility of the rare earth metal salt. For example, the hydrogen ion concentration of the solution may be gradually altered, preferably by absorption into the solution or volatilization out of the solution of a volatile base, such as ammonia, or a volatile acid, such as acetic acid.

The principles of the invention are clearly illustrated by the following example of the separation of lanthanum and praseodymium:

The formation constants for the complexes formed between the chelating agents hydroxyethylethylenediaminetriacetic acid (HEDTA) and diethylenetriaminepentaacetic acid (DTPA) and the cations cadmium, lanthanum and praseodymium are:

|       | Cadmium | Lanthanum | Praseodymium |
|-------|---------|-----------|--------------|
| HEDTA | 13.0    | 13.22     | 14.39        |
| DTPA  | 18.93   | 19.96     | 21.85        |

If iodate anion is added to an aqueous solution of lanthanum and praseodymium HEDTA complexes, a precipitate will not form because of the low concentration of free cations. If cadmium is slowly added to this solution, a competition for the chelating agent occurs. Each cation will compete with the other cations present in the solution for the chelating agent. The cations involved will tend to form complexes according to their respective formation constants. The cation (praseodymium) that forms the most stable complex will tend to remain complexed, while the cations (lanthanum and cadmium) that form about equally stable complexes will tend to form complexes about equally.

This means that the concentration of free lanthanum ions will gradually increase as more and more lanthanum is replaced from its complex by the introduced cadmium. Lanthanum forms the more insoluble iodate and selectively precipitates. However, a fairly large amount of praseodymium coprecipitates under these conditions.

Complexation and replacement using one chelating agent produces results similar to other methods of precipitation from homogeneous solution.

A marked improvement in the separation of lanthanum and praseodymium is realized when two chelating agents are used together in the same solution. When a combination of DTPA and HEDTA are used to complex lanthanum and praseodymium, with cadmium as the replacement ion, an excelent separation is realized. The increased separation efficiency is due to a combination of slight differences in the stability of the complexes and the solubility of the iodates of lanthanum and praseodymium. Lanthanum forms the least stable complex with both chelating agents and also the most insoluble iodate. Each slight difference is additive and makes the improved separation possible.

An examination of the formation constants for DTPA and HEDTA will show that if approximately equal molar amounts of these two chelating agents are added to equal molar amounts of the two rare earth ions, then most of the praseodymium would be complexed by the DTPA and most of the lanthanum would be in the HEDTA complex. If cadmium is slowly added to this solution, a competition for both chelating agents occurs. Cadmium forms a complex with HEDTA that is of about equal stability with lanthanum. However, cadmium forms a complex with DTPA that is considerably less stable than the praseodymium-DTPA complex. As cadminum is added the chief disturbance is to the HEDTA equilibria which contains essentially only lanthanum. Therefore the lanthanum is selectively replaced from its complex and precipitated, while the praseodymium tends to remain in solution as the praseodymium-DTPA complex.

A typical procedure is as follows: about 100 mg. of lanthanum oxide (0.6 mmole), about 100 mg. of praseodymium oxide (0.6 mmole), about 0.6 mole of HEDTA, about 0.6 mole of DTPA, and 10 moles of ammonium acetate are dissolved in water in a 250 ml. beaker. The pH is adjusted to 5.0 with acetic acid or ammonia. Varying amounts of potassium iodate are added depending on the fraction of rare earths that are to be precipitated. If 16 mmoles of potassium iodate are added about 50% of the rare earths will precipitate. If 24 mmoles are added about 65% of the rare earths will precipitate. The final volume is adjusted to about 150 ml. and the final pH to 5.0.

The solution is stirred and 50 ml. of 0.02 M cadmium chloride, pH 5.0 with acetate buffer, are added dropwise to the solution. After all the cadmium chloride has been added, the solution is allowed to stand for several hours to eliminate any super-saturation and then filtered.

The separations obtained by this procedure were determined with radioactive lanthanum-140 and praseodymium-143 as tracers. The distribution of the lanthanum-140 in the precipitate and filtrate indicated the distribution of the lanthanum. The distribution of the praseodymium-143 in the precipitate and filtrate indicated the distribution of the praseodymium.

The results can be summarized as follows: when 50% of the lanthanum precipitates about 6% of the praseodymium coprecipitates, when 80% of the lanthanum precipitates about 12% of the praseodymium coprecipitates, when 95% of the lanthanum precipitates about 18% of the praseodymium coprecipitates, when 99% of the lanthanum precipitates about 30% of the praseodymium coprecipitates. This means that about 70% of the praseodymium is left in the filtrate with about 1% of the lanthanum in one precipitation.

Other replacement cations may be used instead of cadmium, including cobalt (II), manganese (II), zinc, and even hydrogen ion. In the foregoing example, hydrogen ion can be used effectively as a replacement cation by absorbing acetic acid from the vapor phase into the solution of lanthanum complexed with DTPA and HEDTA in the presence of iodate anion.

Other precipitating anions which may be used are carbonate, oxalate, phosphate, tungstate, bromate, chromate, fluoride, molybdate and selenate. The most suitable replacement cation and precipitating anion will depend on the particular rare earth separation to be effected and the sequestering agent combination used.

Other useful chelating agents for use in separating rare earth metals are 1,2-diaminocyclohexane-N,N'-tetraacetic acid (DCHTA), ethylenediaminetetraacetic acid (EDTA) and ethyleneglycol-bis(2-aminoethyl)ether-N, N'-tetraacetic acid (EGTA). Many other sequestering agents forming complexes with rare earth metals are known in the art.

Among the combinations of agents suitable for separating lanthanum and praseodymium are EDTA and DTPA with iodate or oxalate using cobalt (II) as the replacement ion; DTPA and DCHTA with iodate using cobalt (II) as the replacement ion; and DTPA and HEDTA with iodate using cobalt (II) or cadmium as replacement ions.

Neodymium and samarium can be effectively separated using iodate as the precipitating ion and zinc as the replacement ion with any of the following combinations of sequestering agents: DTPA and EDTA; DTPA and HEDTA; DTPA and DCHTA; and DTPA, EDTA and DCHTA (three in one solution).

Other rare earth separations which have been effected by the method of the invention are outlined in the following table, in which lambda is the separation coefficient obtained in each example:

| Chelating Agents | Replacement Method | Precipitant—Anion | Lambda |
|---|---|---|---|
| *Praseodymium—Neodymium* | | | |
| DTPA—HEDTA | Cd++ added | Iodate | 2.4 |
| DTPA—HEDTA | Zn++ added | do | 2.4 |
| DTPA—HEDTA | HOAc volatilized | do | 3.0 |
| DTPA—HEDTA | do | Oxalate | 2.4 |
| DTPA—DCTA | do | Iodate | 2.0 |
| DTPA—DCTA | Mn++ added | do | 2.8 |
| DTPA—EDTA | HOAc volatilized | do | 2.0 |
| DTPA—EGTA | do | do | 1.6 |
| *Europium—Gadolinium* | | | |
| DTPA—DCTA | Zn++ added | Oxalate | 1.03 |
| DTPA—DCTA | HOAc volatilized | do | 1.14 |
| HEDTA—DCTA | do | Iodate | 1.66 |
| HEDTA—EGTA | NH3 volatilized | Phosphate | 1.05 |
| HEDTA—EGTA | HOAc volatilized | Iodate | 1.35 |

In the table the term "volatilized" denotes that the volatile acid or base was absorbed in the rare earth metal containing solution from the ambient atmosphere.

It will be seen that the principle of the invention is of general application in the separation of rare earth metals and that it is not limited to the specific examples set forth above for the purpose of illustration.

I claim:
1. The method of separating a rare earth metal value from a solution containing additional rare earth metal values which comprises:
   (a) adding to said solution at least two polyaminopolyacetic acid rare earth metal sequestering agents,
   (b) thereafter adding an anion forming a relatively insoluble salt with the rare earth metal having the least chelate stability,
   (c) further decreasing the solubility of the relatively insoluble salt by then adding a cationic replacing agent to the solution, and
   (d) separating the thus formed precipate of the relatively insoluble salt.

2. The method of separating a rare earth metal value from a solution containing additional rare earth metal values which comprises:
   (a) adding to said solution at least two polyaminopolyacetic acid rare earth metal sequestering agents, insoluble salt with the rare earth metal having the
   (b) thereafter adding an anion forming a relatively insoluble salt with the rare earth metal having the least chelate stability,
   (c) further decreasing the solubility of the relatively insoluble salt by then absorbing a volatile acid or a volatile base into the solution, and
   (d) separating the thus formed precipitate of the relatively insoluble salt.

3. The method of separating lanthanum and praseodymium which comprises adding to a solution containing lanthanum and praseodymium complexes with at least two polyaminopolyacetic acid sequestering agents, a cationic replacing agent and an anion forming a relatively insoluble salt with lanthanum, and separating the thus formed relatively insoluble lanthanum salt.

4. The method of separating lanthanum and praseodymium which comprises adding to a solution containing lanthanum and praseodymium complexes with at least two polyaminopolyacetic acid sequestering agents, cadmium cation and an anion forming a relatively insoluble salt with lanthanum, and separating the thus formed relatively insoluble lanthanum salt.

5. The method of separating lanthanum and praseodymium which comprises adding to a solution containing lanthanum and praseodymium complexes with at least two polyaminopolyacetic acid sequestering agents, cadmium cation and iodate anion, and separating the thus formed precipitate of lanthanum iodate.

References Cited by the Examiner

Chaberek et al., Organic Sequestering Agents, John Wiley and Sons, Inc., New York, 1959, pages 346 to 348.

Kotlyarov et al., article in Rare Earth Elements, published by the Academy of Sciences, U.S.S.R., Moscow, 1959, pages 64 to 69.

Krumholz et al., Proceedings of the International Conference on the Peaceful Uses of Atomic Energy, vol. 28, Geneva, 1958, pages 184–195 (pages 189–190 of particular interest).

Marsh, Journal of the Chemical Society (London), 1950, pages 1819, 1823.

Marsh, Journal of the Chemical Society (London), 1951, pages 1461–1463.

OSCAR R. VERTIZ, *Primary Examiner.*

MAURICE A. BRINDISI, *Examiner.*

H. T. CARTER, *Assistant Examiner.*

UNITED STATES PATENT OFFICE
CERTIFICATE OF CORRECTION

Patent No. 3,275,404                                September 27, 1966

Ferdinand H. Firsching

It is hereby certified that error appears in the above numbered patent requiring correction and that the said Letters Patent should read as corrected below.

Column 4, line 13, for "precipate" read -- precipitate --; line 20, strike out "insoluble salt with the rare earth metal having the".

Signed and sealed this 1st day of August 1967.

(SEAL)
Attest:

Edward M. Fletcher, Jr.

Attesting Officer

EDWARD J. BRENNER

Commissioner of Patents